(12) United States Patent
Shen et al.

(10) Patent No.: US 6,401,059 B1
(45) Date of Patent: Jun. 4, 2002

(54) METHOD AND SYSTEM FOR USING A PERSONAL DIGITAL ASSISTANT AS A REMOTE CONTROL

(75) Inventors: HongHai Shen; Josephine Miu Cheng, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/318,689

(22) Filed: May 25, 1999

(51) Int. Cl.[7] .............................................. G06F 9/455
(52) U.S. Cl. ............................ 703/27; 341/176; 386/83
(58) Field of Search ............................... 703/23–26, 27; 348/114; 341/176; 386/83

(56) References Cited

U.S. PATENT DOCUMENTS

| | | | |
|---|---|---|---|
| 5,410,367 A | | 4/1995 | Zahavi et al. |
| 5,625,608 A | | 4/1997 | Grewe et al. |
| 5,635,979 A | * | 6/1997 | Kostreski et al. ........... 725/132 |
| 5,646,608 A | | 7/1997 | Shintani |
| 5,710,605 A | | 1/1998 | Nelson |
| 5,721,837 A | | 2/1998 | Kikinis et al. |
| 5,778,256 A | | 7/1998 | Darbee |
| 5,835,732 A | * | 11/1998 | Kikinis et al. ............... 710/101 |
| 6,078,348 A | * | 1/2000 | Klosterman et al. ........ 348/906 |
| 6,097,441 A | * | 8/2000 | Allport ........................ 348/120 |
| 6,104,334 A | * | 8/2000 | Allport ........................ 341/175 |
| 6,141,693 A | * | 11/2000 | Perlman et al. .............. 348/180 |
| 6,151,059 A | * | 11/2000 | Schein et al. ................ 345/327 |
| 6,169,541 B1 | * | 1/2001 | Smith .......................... 348/564 |
| 6,169,879 B1 | * | 1/2001 | Perlman ...................... 725/109 |
| 6,233,389 B1 | * | 5/2001 | Barton et al. ................. 386/68 |

OTHER PUBLICATIONS

Schwartz, E., "IBM Develops uUniversal Device Controller", InfoWorld, Dec. 28, 1998/Jan. 4, 1999, vol. 20, Issue 52/1. p. 3.*

OmniRemote, "Products of the Year 1998 (continued)", PalmPower Magazine, Jan. 1999, p. 4.*

MoDAL (Mobile Document Application Language), downloaded from www.almaden.ibm.com.*

Choy, C. S., "An Infra–red Remote Control System Designed for Universal Control", IEEE Transactions on Consumer Electronics, vol. 41, Issue 4, Nov. 19, 1995, pp. 1089–1094.*

DeGroot, D., "Viewing Next–generation Universal Remote from a User–Activity Perspective", Digest of Tech. Papers ICCE International Conf. on Consumer Electronics, 1997, pp. 332–333.*

Zeisel et al., "A Interactive Menu–Drive Remote Control Unit for TV–recievers and VC–recorders", IEEE Transactions on Consumer Electronics, vol. 34, Issue 3, Aug. 1988, pp. 814–818.*

Demers et al., "Research Issues in Ubiquitiuos Computing", Proc. 13th Annual ACM Symposium on Principles of Distributed Computing, Aug. 1994, pp. 2–8.*

* cited by examiner

Primary Examiner—Russell Frejd
(74) Attorney, Agent, or Firm—Sawyer Law Group LLP; Ingrid M. Foerster

(57) ABSTRACT

The present invention provides a method and system for controlling a device. The system includes a personal digital assistant with a computer program for receiving a program information from a source and selecting a program based upon the program information; and an emulator for sending a signal to a device based upon the selected program. The personal digital assistant receives the program information from a source and selects a program based upon the program information. In the preferred embodiment, the device includes a television and a video cassette recorder. With the method and system of the present invention, a user can place into use the program schedule information in the personal digital assistant without the need for a separate remote control. This simplifies the use of the program schedule information in the personal digital assistant.

60 Claims, 6 Drawing Sheets

FIG. 3
PRIOR ART

METHOD AND SYSTEM FOR USING A PERSONAL DIGITAL ASSISTANT AS A REMOTE CONTROL

FIELD OF THE INVENTION

The present invention relates to personal digital assistants and more particularly to using a personal digital assistant as a remote control.

BACKGROUND OF THE INVENTION

Personal Digital Assistants (PDA's), such as 3COM's PALMPILOT and INTERNATIONAL BUSINESS MACHINE CORPORATION'S WORKPAD, are very popular today. Millions of users around the world now use some type of PDA. The PDA's are mainly used as an information device for applications such as a calendar, email, address book, and memo pad.

FIG. 1A is a simple block diagram illustrating some of the components of a conventional PDA. The PDA 100 comprises a central processing unit 102 (CPU) and memory 104. Software is stored on the memory 104 and executed by the CPU 102. Some PDA's also has an infrared port 106 used for transmitting information between PDA's. A user of the PDA 100 may store various information in the PDA's memory 104. For example, the user may input and store television program schedules and refer to this information when interested in watching television.

FIG. 1B is a block diagram illustrating the combination of a conventional television 110, video cassette recorder 112 (VCR), and universal remote control 108. When the user determines which television program he/she wishes to watch, based on the schedule information on his/her PDA, the user can utilize a universal remote 108 to send instructions to a television 110 via an infrared signal to display that program. If the user wishes to record a program, he/she may use the universal remote 108 to program the VCR 112 with the time, date, and channel of the program via another infrared signal.

However, this method of accessing program information, and controlling the television and VCR based on this information, is cumbersome to the user. The user must operate both a PDA and a remote control in order to place the program schedule information in the PDA 100 to use with the television 110 and VCR 112.

Accordingly, there exists a need for a method and system of simplifying the use of program schedule information through a remote control. The method and system should be easy to implement. The present invention addresses such a need.

SUMMARY OF THE INVENTION

The present invention provides a method and system for controlling a device. The system includes a personal digital assistant with a computer program for receiving a program information from a source and selecting a program based upon the program information; and an emulator for sending a signal to a device based upon the selected program. The personal digital assistant receives the program information from a source and selects a program based upon the program information. In the preferred embodiment, the device includes a television and a video cassette recorder. With the method and system of the present invention, a user can place into use the program schedule information in the personal digital assistant without the need for a separate remote control. This simplifies the use of the program schedule information in the personal digital assistant.

BRIEF DESCRIPTION OF THE FIGURES

FIG. 3 is a sample of program schedule information available from the Internet.

DETAILED DESCRIPTION

The present invention provides a method and system for using a personal digital assistant (PDA) as a remote control. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention simplifies the use of program schedule information through a remote control by utilizing the PDA which stores the program schedule information as the remote control.

To more particularly describe the features of the present invention, please refer to FIGS. 2 through 5 in conjunction with the discussion below.

Figure 1A:
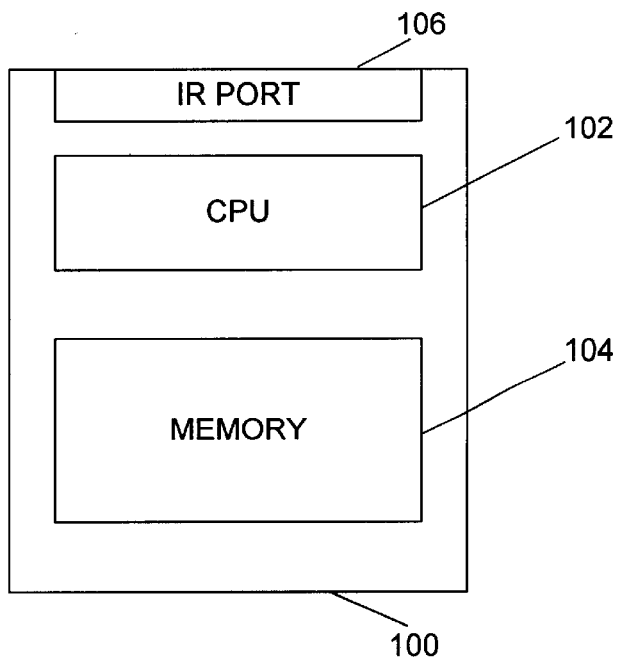
FIG. 1A is a block diagram illustrating a conventional personal digital assistant.
Figure 1B:
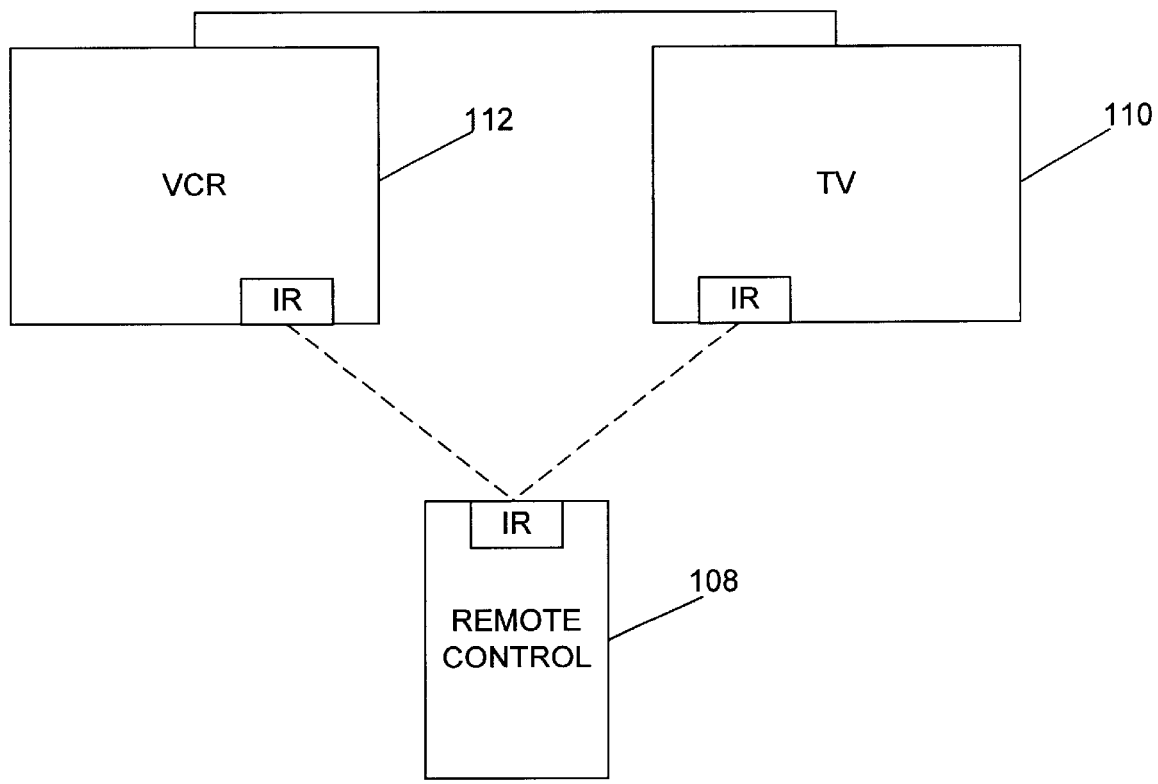
FIG. 1B is a block diagram illustrating. a conventional combination of a television, a video cassette recorder, and a universal remote control.
Figure 2:
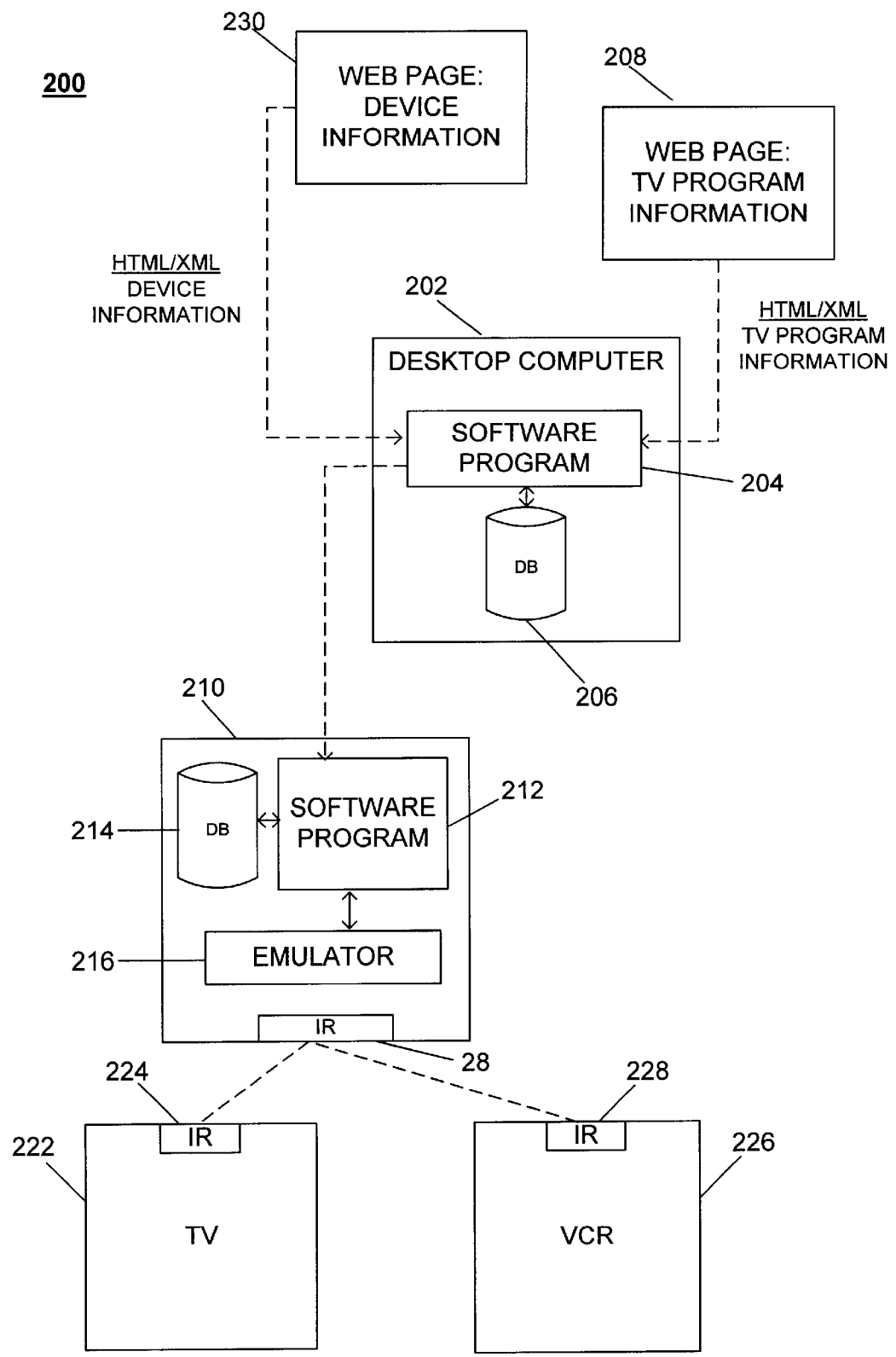
FIG. 2 is a block diagram illustrating a system which utilizes a personal digital assistant as a remote control in accordance with the present invention.
Figure 3:
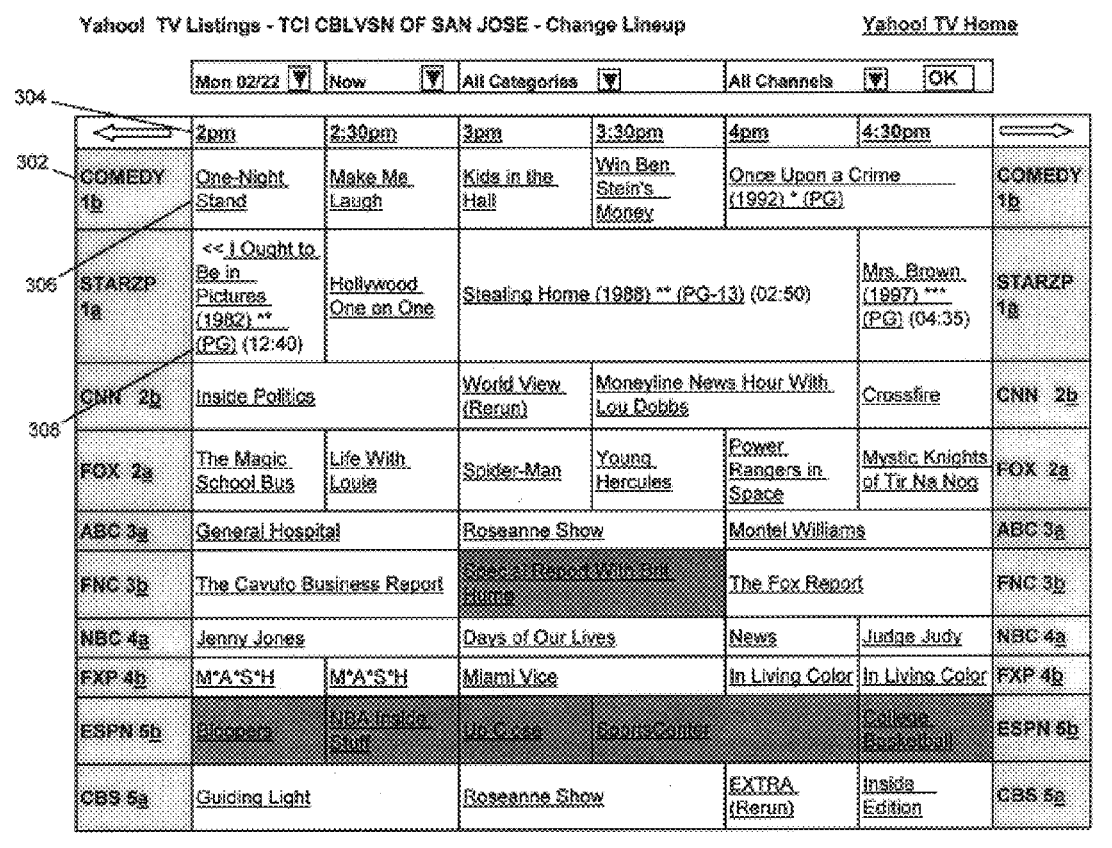

FIG. 2 is a block diagram illustrating a system which utilizes a PDA as a remote control in accordance with the present invention. The system 200 comprises a desktop computer 202. The desktop computer 202 comprises a software program 204 and a database 206. The software program 204 downloads television program schedule information from a web page 208 via the Internet and places it into the database 206. FIG. 3 illustrates an example of such TV program schedule information, available from Yahoo!. The information includes the channel 302, program times 304, title 306 and rating 308.

Typically, this information is in the Hypertext Markup Language (HTML) format. However, information displayed using HTML is not structured, i.e., HTML describes how the information is to be displayed but does not identify the information. Without this identification, the information cannot be directly stored into the database 206. Thus, the software program 204 has the capability to convert the information from the HTML format to a more database-friendly format, such as the Extended Markup Language (XML). The program 204 also has the capability to filter the information based upon user-defined preferences. For example, the user may wish to only retain program information concerning certain times, days, channels, or any combination thereof.

Once converted and filtered, the remaining TV program information is transported to the user's PDA 210 through a connection between the PDA 210 and the desktop computer 202. This connection could comprise a "cradle" (as used by the PALM PILOT), a serial connection, remote connection through a modem, or a wireless connection. The PDA 210 comprises a software program 212, a database 214, an emulator 216, and an infrared port 218. The information from the desktop computer 202 is received by the software program 212 and stored in the database 214. The software program 212 allows the user to perform queries on the information. For example, the user may wish to only view TV program information for a particular title, actor, category (such as sports, action, and comedy), or any combination thereof The user may also set an alarm to notify him/her when a particular TV program is about to begin. The results of the user's query is displayed through a graphic user interface (GUI) (not shown) on the PDA 210.

The PDA 210 also comprises an emulator 216 which emulates a remote control. An emulator 216 is well known in the art and will not be discussed in detail here. Once the user determines which TV program he/she wishes to watch, the user may select the program through the GUI of the PDA 210. This selection will cause the emulator 216 to send instructions to the television 222 to display the selected TV program. The instructions are sent via an infrared signal outputted through the infrared port 218 of the PDA 210 to the infrared port 224 of the television 222. The television then displays the selected TV program. The PDA 210 may also provide other conventional remote control functions, such as recall, volume control, and muting.

In addition, the software program 212 allows the user to send an infrared signal to an infrared port 228 on the VCR 226 to program a recording of a selected TV program. When the user selects a TV program for recording, the software program 212 causes the emulator 216 to send an infrared signal to the VCR 226. In the preferred embodiment, the software program 212 uses the TV program information for the selected program to send a signal which automatically programs the VCR 226 for recording. The signal would includes the times, date, channel, and any other information needed by the VCR 226 for the selected TV program. Thus, with the present invention, the user need not manually program the VCR 226 to record. The PDA 210 may also provide conventional remote control functions, such as forwarding, rewinding, and play.

Infrared control information for the user's device, i.e., the television or VCR, may be downloaded from a web page 230 on the Internet and stored onto the PDA 210. The device information may be transported to the PDA 210 via the connection between the PDA 210 and the desktop computer 202. The PDA 210 is then configured to function as a remote control based upon this information.

Figure 4A:
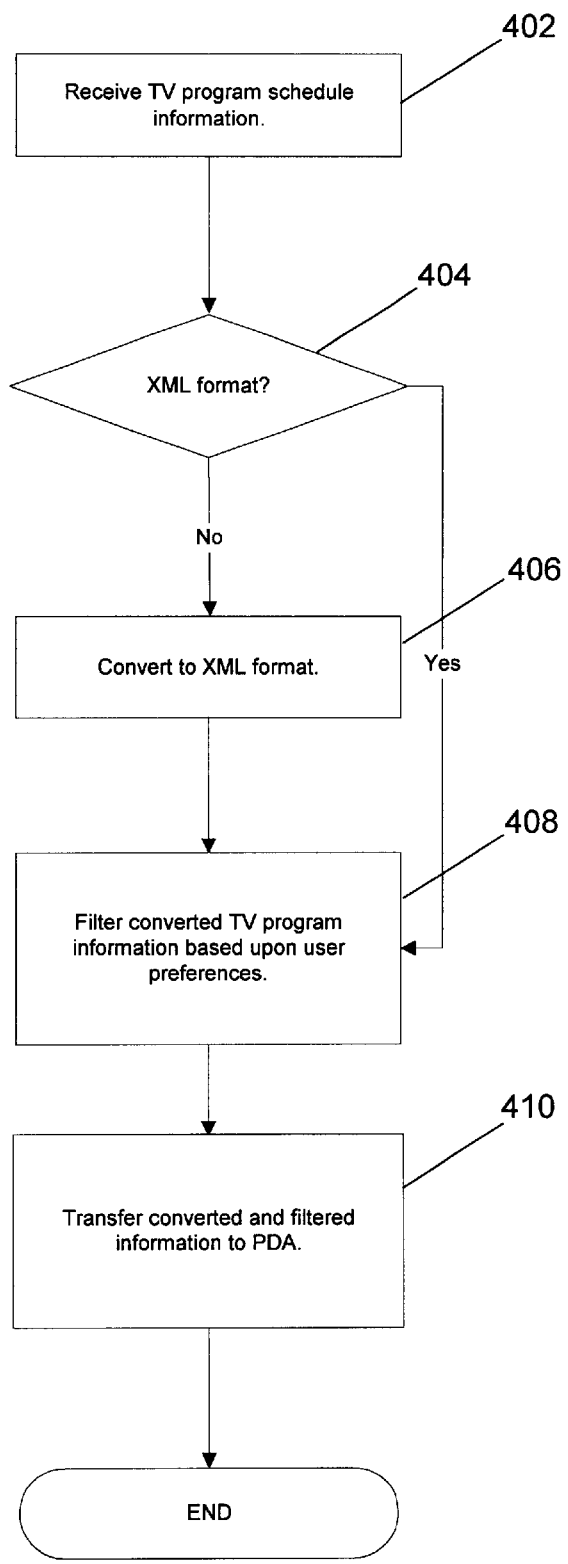
FIGS. 4A and 4B are flow charts illustrating a preferred embodiment of a software program in a desktop in accordance with the present invention.
Figure 4B:
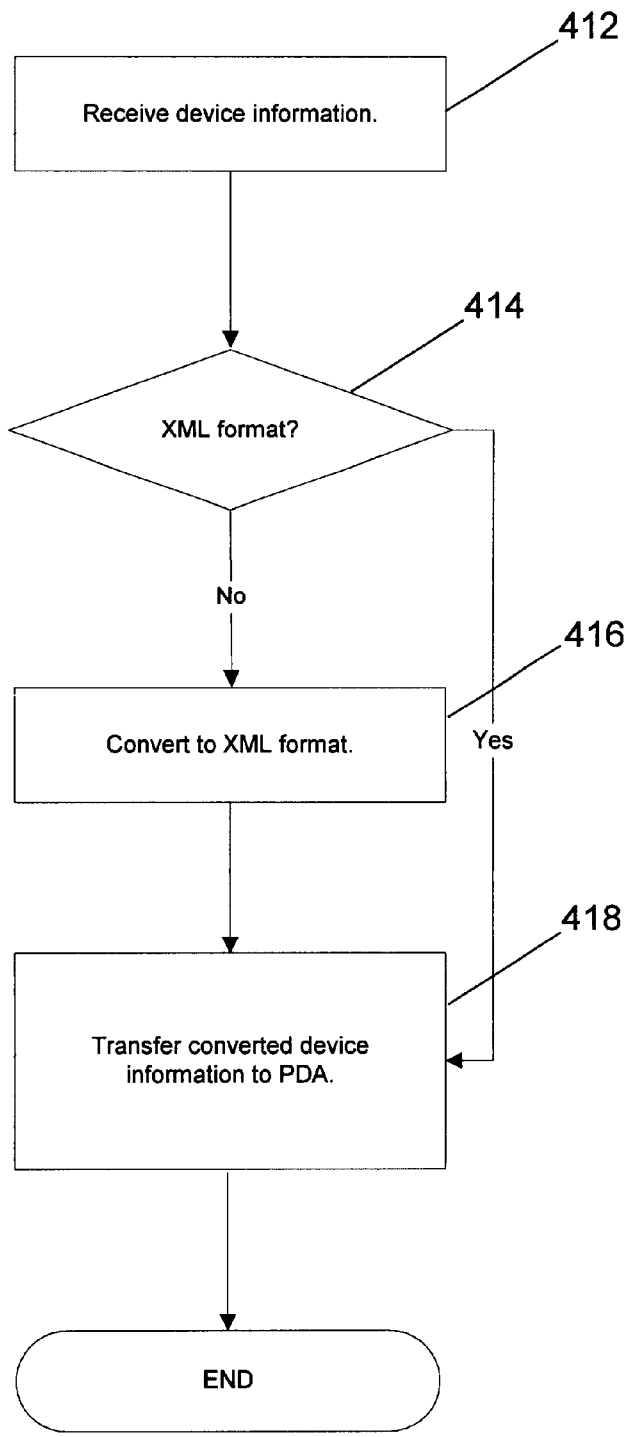

FIGS. 4A and 4B are flow charts which illustrate a preferred embodiment of the software program 204 in the desktop 202 in accordance with the present invention. In FIG. 4A, first the software program 204 receives the TV program schedule information, via step 402. This information is placed in the database 206. Next, the software program 204 determines if the TV program information is in the XML format, via step 404. If not, then the information is converted to the XML format, via step 406. If so, then step 406 is skipped. The converted information is then filtered based upon user preferences, via step 408. The TV program information may be filtered to extract only program information concerning certain times, days, channels, or any combination thereof. The converted and filtered TV program information is then transferred to the PDA 210, via step 410. In the preferred embodiment, this transfer is accomplished through a cradle, serial cable, modem, or wireless connection between the computer 202 and the PDA 210.

In FIG. 4B, first the software program 204 receives the device information, via step 412. This information is placed in the database 206. Next, the software program 204 determines if the device information is in the XML format, via step 414. If not, then the device information is converted to the XML format, via step 416. If so, then step 416 is skipped. The converted device information is then transferred to the PDA 210, via step 418. In the preferred embodiment, this transfer is accomplished through a cradle, serial cable, modem, or wireless connection between the computer 202 and the PDA 210.

Figure 5:
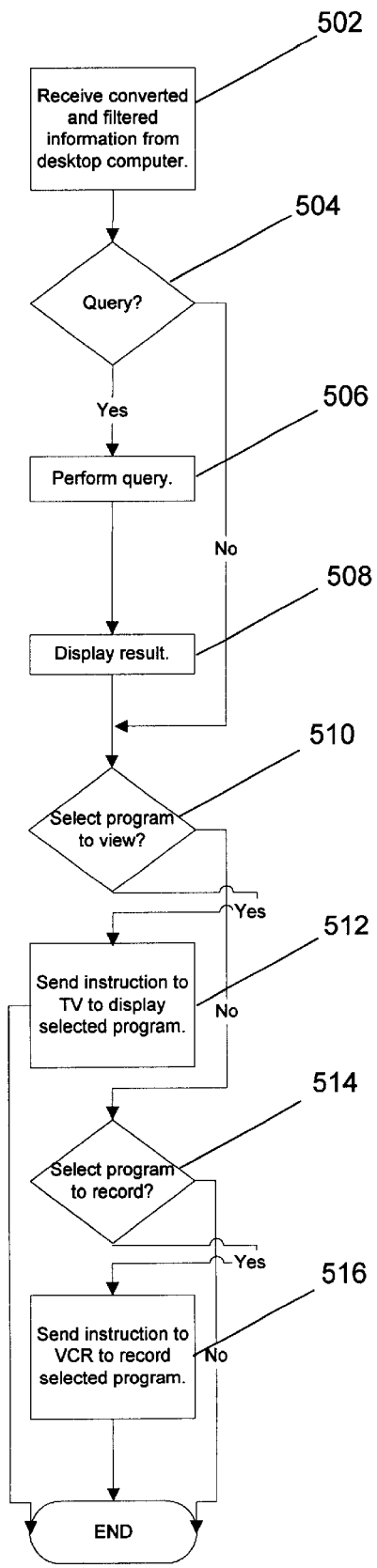
FIG. 5 is a flow chart illustrating a preferred embodiment of a software program in a personal digital assistant in accordance with the present invention.

FIG. 5 is a flow chart which illustrates a preferred embodiment of the program 212 in the PDA 210 after the converted and filtered TV program information is transferred to it. First, the converted and filtered information in the XML format is received by the software program 212 from the desktop 202, via step 502. The converted and filtered TV program information is placed into a database 214. The user may perform queries on the information, via step 504. If the user initiates a query, then the query is performed, via step 506, and the result is displayed, via step 508, through the GUI on the PDA 210. Sample queries include searching for TV programs based on category, title, actor, or any combination thereof The user may also set an alarm to notify him/her when a TV program is about to begin. Next, the user may select a TV program for viewing, via step 510, using the PDA 210. In this case, the software program 212 causes the emulator 216 to send instructions to the television 222, via step 512, through its infrared port 218 to display the selected TV program. The user may also select a TV program for recording at a later time, via step 514. In this case, the software program 212 causes the emulator 216 to send instructions to the VCR 226, via step 516, which automatically programs the VCR 226 to record the selected TV program for the user.

Although the present invention is described with the desired format being XML, one of ordinary skill in the art will understand that any database-friendly format may be used without departing from the spirit and scope of the present invention.

A method and system for using a personal digital assistant as a remote control has been disclosed. With the present invention, a user can place into use the program schedule information in the personal digital assistant without the need for a separate remote control. This simplifies the use of the program schedule information in the personal digital assistant.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A personal digital assistant, comprising:

a computer readable medium with a computer program for receiving a television program information from a source;

a data storage medium coupled to the computer readable medium for storing the television program information, wherein the computer program comprises program instructions for:

receiving a query from a user, performing the query by searching the television program information in the data storage medium, displaying a result of the query, and selecting a television program from the result of the query; and an emulator for sending a signal to a device based upon the selected television program.

2. The personal digital assistant of claim 1, wherein the source comprises a web page on the Internet.

3. The personal digital assistant of claim 1, wherein the query comprises a search based on category, actor, title, or any combination thereof.

4. The personal digital assistant of claim 1, wherein the selecting comprises:

setting an alarm to signify an imminent beginning of a television program.

5. The personal digital assistant of claim 1, wherein the emulator comprises:

a mechanism for creating the signal; and an infrared port for outputting the signal.

6. The personal digital assistant of claim 1, wherein the signal comprises:

instructions for displaying the selected television program on the device.

7. The personal digital assistant of claim 1, wherein the signal comprises:

instructions for programming the device for a later recording of the selected television program.

8. The personal digital assistant of claim 1, wherein the computer program receives information about the device from a web page on the Internet.

9. A system for controlling a device, comprising:

a source for television program information;

a personal digital assistant, wherein the personal digital assistant comprises:

a computer readable medium with a computer program for receiving the television program information from the source, and a data storage medium coupled to the computer readable medium for storing the television program information, wherein the computer program comprises instructions for:

receiving a query from a user, performing the query by searching the television program information in the data storage medium, displaying a result of the query, and selecting a television program from the result of the query; and an emulator coupled to the personal digital assistant for sending a signal to the device based upon the selected television program.

10. The system of claim 9, wherein the source comprises a web page on the Internet.

11. The system of claim 9, wherein the personal digital assistant receives information about the device from a web page on the Internet.

12. The system of claim 9, wherein the query comprises a search based on category, actor, title, or any combination thereof.

13. The system of claim 9, wherein the selecting comprises:

setting an alarm to signify an imminent beginning of a television program.

14. The system of claim 9, wherein the emulator comprises:

a mechanism for creating the signal; and an infrared port for outputting the signal.

15. The system of claim 9, wherein the signal comprises:

instructions for displaying the selected television program on the device.

16. The system of claim 9, wherein the signal comprises:

instructions for programming the device for a later recording of the selected television program.

17. The system of claim 9, further comprising:

a computer coupled between the source and the personal digital assistant for receiving the television program information in a first format from the source, converting the television program information to a second format, and filtering the converted television program information based upon user preferences; and a transfer device coupled to the computer for transferring the converted and filtered television program information to the personal digital assistant.

18. The system of claim 17, wherein the computer further includes:

a computer readable medium; and a data storage medium coupled to the computer readable medium for storing the television program information.

19. The system of claim 17, wherein the first format is a Hypertext Markup Language (HTML) format.

20. The system of claim 17, wherein the second format is a Extended Markup Language (XML) format.

21. The system of claim 17, wherein the filtering comprises:

extracting television program information based upon the times, days, channels, or any combination thereof of each television program in the television program information.

22. The system of claim 17, wherein the transfer device comprises a cradle.

23. The system of claim 17, wherein the transfer device comprises a serial connection.

24. The system of claim 17, wherein the transfer device comprises a modem.

25. The system of claim 17, wherein the transfer device comprises a wireless connection.

26. The system of claim 9, wherein the device comprises a television.

27. The system of claim 9, wherein the device comprises a video cassette recorder.

28. A method for controlling a device, comprising the steps of:

(a) receiving television program information by a personal digital assistant;

(b) storing the television program information in the personal digital assistant;

(c) receiving a query from a user;

(d) performing the query by searching the television program information in the personal digital assistant;

(e) displaying a result of the query;

(f) selecting a television program based upon the displayed result of the query; and (g) sending a signal to the device based upon the selected television program.

29. The method of claim 28, wherein the query comprises a search based on category, actor, title, or any combination thereof.

30. The method of claim 28, wherein the selecting step (f) comprises:

(f1) setting an alarm to signify an imminent beginning of a television program.

31. The method of claim 28, wherein the signal comprises:
   (a) displaying the selected television program on the device.

32. The method of claim 28, wherein the signal comprises:
   (a) programming the device for a later recording of the selected television program.

33. The method of claim 28, wherein the receiving step (a) comprises:
   (a1) receiving television program information in a first format by a computer;
   (a2) converting the television program information to a second format;
   (a3) filtering the converted television program information based upon user preferences; and
   (a4) transferring the converted and filtered television program information to the personal digital assistant.

34. A system for controlling a device, comprising:
   a source for television program information;
   a computer for receiving the television program information in a first format from the source, converting the television program information to a second format, and filtering the converted television program information based upon user preferences;
   a transfer device coupled between the computer and a personal digital assistant for transferring the converted and filtered television program information from the computer to the personal digital assistant;
   the personal digital assistant for receiving the converted and filtered television program information from the computer, storing the converted and filtered television program information, receiving a query from a user, performing the query by searching the stored television program information, displaying a result of the query, and selecting a television program from the result of the query; and
   an emulator coupled to the personal digital assistant for sending a signal to the device based upon the selected television program.

35. The system of claim 34, wherein the computer further comprises:
   a computer readable medium; and
   a data storage medium coupled to the computer readable medium for storing the television program information.

36. The system of claim 34, wherein the first format is a Hypertext Markup Language (HTML) format.

37. The system of claim 34, wherein the second format is a Extended Markup Language (XML) format.

38. The system of claim 34, wherein the filtering of the computer comprises:
   extracting television program information based upon the times, days, channels, or any combination thereof of each television program in the television program information.

39. The system of claim 34, wherein the transfer device is a cradle.

40. The system of claim 34, wherein the transfer device is a serial connection.

41. The system of claim 34, wherein the transfer device is a modem.

42. The system of claim 34, wherein the transfer device is a wireless connection.

43. The system of claim 34, wherein the query comprises a search based on category, actor, title, or any combination thereof.

44. The system of claim 34, wherein the selecting of the personal digital assistant comprises:
   setting an alarm to signify an imminent beginning of a television program.

45. The system of claim 34, wherein the emulator comprises:
   a mechanism for creating the signal; and
   an infrared port for outputting the signal.

46. The system of claim 34, wherein the signal comprises:
   displaying the selected television program on the device.

47. The system of claim 34, wherein the signal comprises:
   programming the device for a later recording of the selected television program.

48. The system of claim 34, wherein the personal digital assistant further comprises:
   a computer readable medium; and
   a data storage medium coupled to the computer readable medium for storing the television program information.

49. The system of claim 34, wherein the device comprises a television.

50. The system of claim 34, wherein the device comprises a video cassette recorder.

51. A method for remote control of a device, comprising the steps of:
   (a) receiving television program information in a first format by a computer;
   (b) converting the television program information to a second format;
   (c) filtering the converted television program information based upon user preferences;
   (d) transferring the converted and filtered television program information to a personal digital assistant, wherein the personal digital assistant:
      (d1) receives a query from a user,
      (d2) performs the query by searching the converted and filtered television program, and
      (d3) displaying a result of the query;
   (e) selecting a television program based upon the result of the query; and
   (f) sending a signal to the device from the personal digital assistant based upon the selected television program.

52. The method of claim 51, wherein the query comprises a search based on category, actor, title, or any combination thereof.

53. The method of claim 51, wherein the selecting step (e) comprises:
   (e1) setting an alarm to signify an imminent beginning of a television program.

54. The method of claim 51, wherein the signal comprises:
   displaying the selected television program on the device.

55. The method of claim 51, wherein the signal comprises:
   programming the device for a later recording of the selected television program.

56. A computer readable medium in a personal digital assistant with program instructions for controlling a device, comprising the instructions for:
   (a) receiving television program information;
   (b) receiving a query from a user;
   (c) performing the query by searching the television program information;

(d) displaying a result of the query;

(e) selecting a television program based upon the result of the query; and (f) sending a signal to the device based upon the selected television program.

57. The computer readable medium of claim 56, wherein the receiving instruction (a) comprises:

(a1) receiving television program information in a first format by a computer;

(a2) converting the television program information to a second format;

(a3) filtering the converted television program information based upon user preferences; and (a4) transferring the converted and filtered television program information to the personal digital assistant.

58. The computer readable medium of claim 56, wherein the selecting instruction (e) comprises:

(e1) setting an alarm to signify an imminent beginning of a television program.

59. The computer readable medium of claim 56, wherein the sending instruction (f) comprises:

(f1) sending a signal for displaying the selected television program on the device.

60. The computer readable medium of claim 56, wherein the sending instruction (f) comprises:

(f1) sending a signal for programming the device for a later recording of the selected television program.

* * * * *

UNITED STATES PATENT AND TRADEMARK OFFICE
CERTIFICATE OF CORRECTION

PATENT NO.   : 6,401,059 B1                                             Page 1 of 1
DATED        : June 4, 2002
INVENTOR(S)  : HongHai Shen and Josephine M. Cheng It is certified that error appears in the above-identified patent and that said Letters Patent is hereby corrected as shown below:

<u>Column 4,</u>
Line 26, after "thereof", add -- . --.

Signed and Sealed this

Twenty-third Day of July, 2002

Attest:

Attesting Officer

JAMES E. ROGAN
Director of the United States Patent and Trademark Office